May 23, 1950 R. E. GETCHELL 2,509,142
TESTING MACHINE FOR RUPTURING SPECIMENS
Filed Oct. 16, 1948
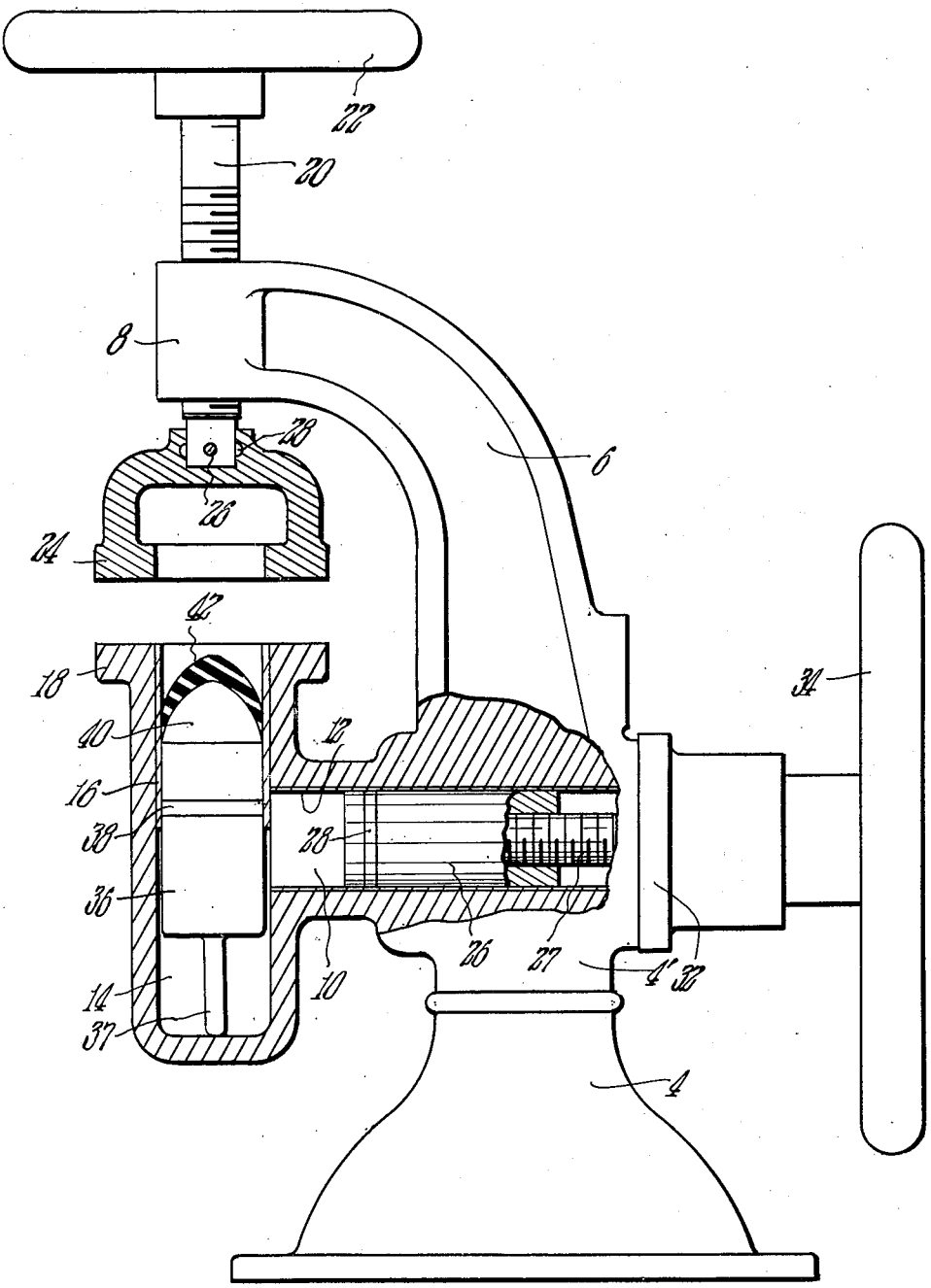
INVENTOR.
Raymond E. Getchell
BY
Ross & Ross
Attys.

Patented May 23, 1950

2,509,142

UNITED STATES PATENT OFFICE 2,509,142

TESTING MACHINE FOR RUPTURING SPECIMENS

Raymond E. Getchell, Holyoke, Mass., assignor to B. F. Perkins & Son, Inc., Holyoke, Mass., a corporation of Massachusetts Application October 16, 1948, Serial No. 54,960

2 Claims. (Cl. 73—102)

This invention relates to testing machines and is directed more particularly to machines for testing material in web or sheet form such as paper, cardboard, textiles and the like.

The principal objects of the invention are directed to the provision of a machine having means for clamping a specimen to be tested for the action of a plunger which is characterized by a resilient or yieldable specimen engaging end.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein the figure is a combined elevational and sectional view showing a testing machine embodying the novel features of the invention.

Referring now to the drawings more in detail, the invention will be fully described.

A base is represented by 4 which has a body 4' secured thereto. An arm 6 extends upwardly and outwardly from the body and terminates in a hub part 8.

The body is provided with a horizontal piston bore 10 which may be provided with a lining 12 and is in communication with a vertical plunger bore 14 which may have a lining 16.

A platform 18 is provided at the upper end of the plunger bore 14 for supporting a specimen to be tested.

A screw 20 is in threaded engagement with the hub 8 and has a hand wheel 22 fixed thereto for rotating the same.

A clamp 24 is rotatable on the lower end of screw 20 by means of a pin 26 disposed in an annular groove 28. The screw 20 may be rotated for clamping a specimen to be tested to the platform 18 by means of member 24.

A piston 26 is reciprocable in the bore 10 and may have one or more piston rings 28. A screw 27 is in threaded engagement with the piston 26 and is rotatable and non-reciprocable in a post 32 of the body. A hand wheel 34 fixed to the screw 27 facilitates rotation thereof to move the piston 26 back and forth in bore 10.

A plunger 36 is reciprocable up and down in the bore 14 and may be provided with one or more rings such as 38. A leg 37 extends downwardly from the plunger for supporting it in the lower position shown.

The upper end 40 of the plunger is more or less pointed as shown and this upper end is capped by a resilient or yieldable cap 42.

Liquid such as oil, glycerine or the like is placed in the bores and as it is displaced from bore 10 as piston 26 is moved towards the bore 14 the plunger 36 is elevated thereby.

The upper capped end of the plunger brings up against a specimen clamped to the platform by the member 24. The specimen tends to resist upward movement of the plunger but movement of the piston tends to displace and compress the liquid until the pressure of liquid prevailing causes the plunger to distend and rupture the specimen.

A pressure gauge or the like may be in communication with the bores to indicate the pressure at which the specimen ruptures and this taken with the area of the plunger may be used as an indication of the strength of the specimen.

The cap or tip 42 will be formed from rubber, rubber composition or some suitable material so as to be relatively yieldable or resilient as distinguished from the metal plunger and being yieldable it has advantages over the tip of the plunger itself in that it acts on the specimen for the intended purpose without injuring it.

The tip 42 may take various forms and it may be secured to the plunger by vulcanization, adhesive, screw threads or the like.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A testing machine of the class described comprising in combination, a body having a piston bore and a plunger bore in communication therewith, a piston reciprocable in said piston bore and a plunger reciprocable in said plunger bore, means to reciprocate said piston for displacing liquid to reciprocate said plunger, said plunger provided with a specimen rupturing tip in the form of a cone formed from yieldable material, a specimen platform, and means for clamping a specimen to said platform for engagement by said tip.

2. A testing machine for rupturing a specimen of sheet material comprising in combination, a body provided with a horizontal specimen supporting platform and a plunger bore having an upper open end in said platform, means to clamp a specimen to said platform over said plunger bore, said body provided with a piston bore in communication with said plunger bore, a plunger in said plunger bore reciprocable between a lower position and an upper specimen rupturing position, a piston reciprocable in said piston bore adapted in movement in one direction to displace fluid to act on and move said plunger to rupturing position, said plunger provided with an upper end having inwardly and upwardly extending sides, and a tip on the upper end of said plunger for rupturing a specimen formed from yieldable material to have upper sides extending inwardly and upwardly in the shape of a cone and being of relatively greater thickness in the central portion than at the sides thereof.

RAYMOND E. GETCHELL.

REFERENCES CITED

The following references are of record in the file of this patent:

UNITED STATES PATENTS

| Number | Name | Date |
| --- | --- | --- |
| 1,237,051 | Kammerer | Aug. 14, 1917 |
| 1,307,775 | Hacker | June 24, 1919 |
| 1,605,311 | Webb | Nov. 2, 1926 |

FOREIGN PATENTS

| Number | Country | Date |
| --- | --- | --- |
| 19,966 | Great Britain | 1906 |